# United States Patent Office 2,835,752
Patented May 20, 1958

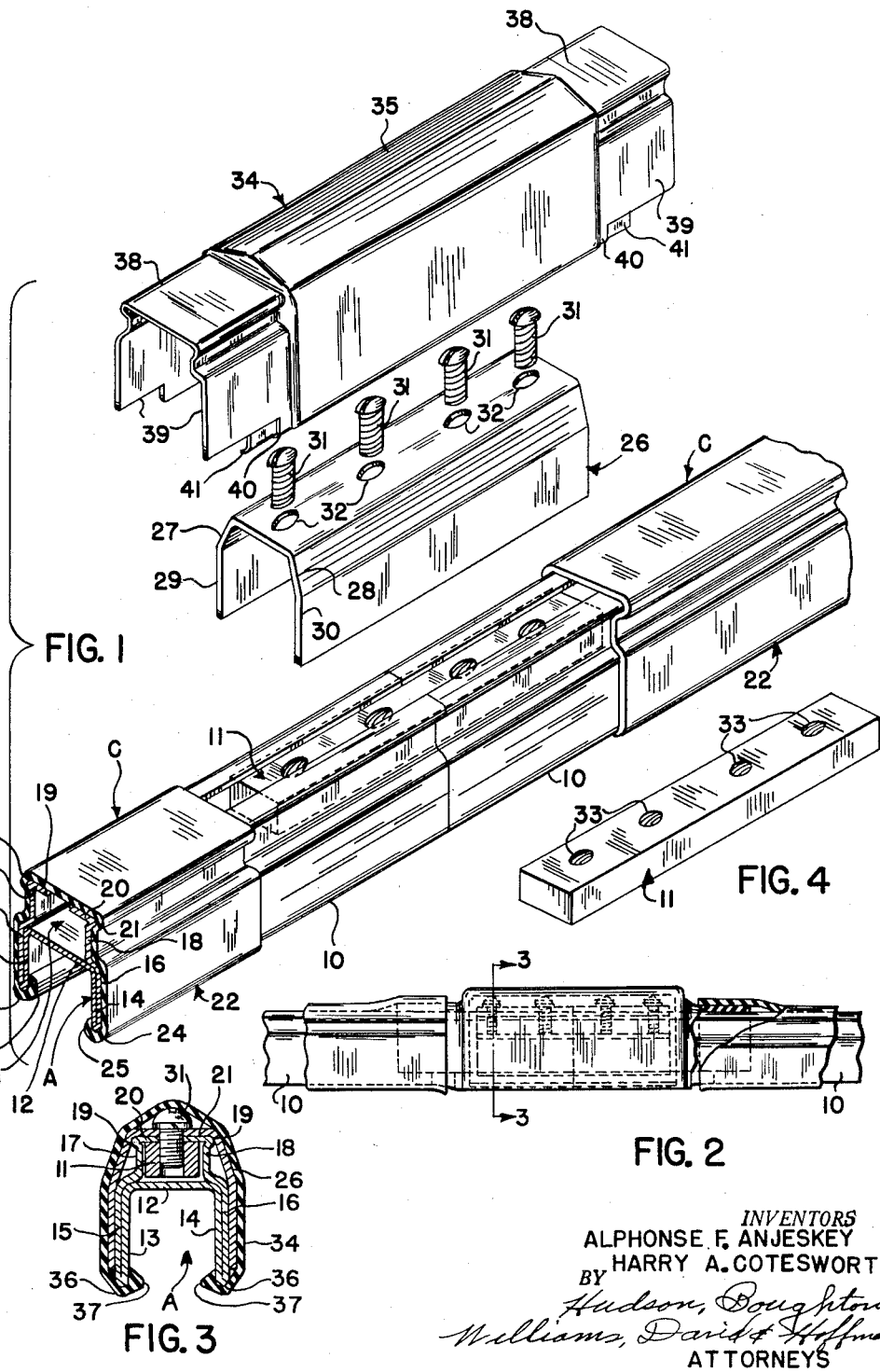

2,835,752

INSULATED COUPLED TROLLEY CONDUIT

Alphonse F. Anjeskey, Cleveland, and Harry A. Cotesworth, Cleveland Heights, Ohio, assignors to The Cleveland Crane & Engineering Company, Wickliffe, Ohio, a corporation of Ohio Application August 18, 1954, Serial No. 450,734

1 Claim. (Cl. 191—23)

The present invention relates to electrical distribution systems for electrified mobile equipment, particularly electrified, overhead monorail equipment, and to a coupling structure for conductor bar of the type having a metal, rod-like member containing a pair of grooves, one of which is adapted to receive a current collector and the other of which is adapted to receive a coupling or dowel bar, said conductor bar also having a channel-like member of insulation covering the external surfaces of the rod-like member.

An object of the present invention is the provision of a novel and improved, shockproof trolley conductor for a electrified, mobile equipment comprising a coupling structure for conductor bar of the above-described type, which structure provides greater rigidity against torsion and bending, and which more accurately aligns adjoining lengths of bar than do the prior art structures.

It is a more specific object of the invention to provide a coupling structure for conductor bar of the above-described type comprising a clamp which confines external surfaces of the rod-like member of the conductor bar, and which augments the strength provided by an internal dowel or coupling bar.

It is a further object of the present invention to provide a new and improved coupling structure for shockproof trolley conductor bar of the above-described type, which coupling structure comprises an internal dowel bar and an external coupling clamp, both of which can be easily assembled, are inexpensive to make, and the assembly of which does not project appreciably above the surface of the rod-like member of the conductor bar.

It is a still further object of the present invention to provide a novel and improved coupling structure for shockproof trolley conductor bar comprising a dowel bar, a clamp, and a coupling cover which fits over the clamp, is easily installed and yet completely covers the exposed surfaces of the rod-like member and clamp of the conductor bar.

The invention resides in certain constructions and combinations and arrangement of parts, and further objects and advantages will be apparent to those skilled in the art to which it relates from the following description of the preferred embodiment described with reference to the accompanying drawings forming a part of this specification, in which:

Fig. 1 is a perspective, partially exploded view of a coupling structure embodying the present invention, in which the internal portion of the coupling structure is assembled in the ends of the conductor bar ready to receive the remaining portions of the coupling structure;

Fig. 2 is a side elevational view of the coupling structure, a portion of which is shown in section;

Fig. 3 is a cross-sectional view taken on the line 3—3 of Fig. 2; and

Fig. 4 is a perspective view of the portion of the coupling structure which is shown positioned inside of the conductor bar in Fig. 1.

As previously mentioned, the present invention is directed to a novel and improved trolley conductor system for electrified, mobile equipment and to a coupling structure for the conductor bar used therein. The particular conductor bar "C" shown in the drawing is of the type having a comparatively rigid, metallic, rod-like structure or member 10 containing a pair of longitudinally extending grooves or channels, one of which A is adapted to receive a trolley structure and the other of which B is adapted to retain a coupling or dowel bar 11. The conductor bar shown also has a channel-like member of insulating material covering the external surfaces of the rod-like structure.

The rod-like structure shown is formed from a single sheet of metal which has been bent to form the rectangularly shaped channels A and B arranged back to back. Channel A is formed by a U-shaped medial portion of the plate, the bottom 12 of which is flat and forms a common wall separating the channels. The side walls 13 and 14 respectively of channel A are reenforced on the outside as at 15 and 16, respectively, by sections of the plate which have been bent back upon walls 13 and 14 and which extend beyond the bottom 12 of channel A and form the side walls 17 and 18 respectively of channel B. These sections of the plate each have a slight offset which bends around the outside corners of the U for a short distance before again turning parallel to each other, thereby spacing the side walls 17 and 18 of channel B closer together than those of channel A. The outer end of channel B is slightly closed by portions 19 and 20 respectively of the plate, which are bent outwardly at 90 degrees for a short distance to form an outer flange as at 21, and then back upon itself towards the center of the channel. The edges 19 and 20 of the plate extend towards but terminate slightly short of each other to provide a slot in the end surface of channel B for a reason as will later be described.

Surrounding the rod-like structure thus formed is a sheath of insulating material 22 which conforms in shape to the external surfaces of the rod-like structure 10 and which contains flanges 23 and 24 which hook under the lower edges of channel A to hold the sheath in place. Flanges 23 and 24 are each provided with a vertical projection 25 on their inside edges which lock the edges of the sheath in place. The insulating material 22 extends for the full length of the rod-like member 10 excepting for those end portions of the rod-like member which are to be connected to other lengths of rod-like member and which will be covered by a coupling structure as will later be described.

The coupling structure of the present invention comprises a dowel bar 11 which conforms in shape to channel B and which is preferably of a rectangular cross-section inserted into the adjoining end portions of adjacent rod-like members arranged in end-to-end relation. The dowel bar 11 is preferably centered in the two rod-like members and thereafter a coupling clamp 26 slipped down over the external surfaces of the rod-like member. The coupling clamp 26 is a rigid member of generally U-shaped cross-section, made from sheet metal or the like, and preferably has its corner edges 27 and 28 beveled at an angle to more closely confine the external surfaces of the rod-like member 10.

Coupling clamp 26 is slipped over the adjacent ends of adjoining conductor bar which have had their insulation removed such that the clamp engages the top and side surfaces of the rod-like members and accurately aligns the ends of the conductor bars. The sides of the clamp 26 bear against the vertical side portions 15 and 16 of the rod-like members and transmit any torsional forces that might be present from one bar to the next. To aid in this regard, the sides 29 and 30 of the U-shaped coupling clamp are preferably tapered inwardly such that they will be sprung into a parallel position when slipped over the external surfaces of the bars to more firmly clamp the side surfaces 15 and 16 of the conductor bar. Once installed, screws 31 are inserted in holes 32 in the conductor clamp 26 and are tightened into the matching taped holes 33 of the dowel bar 11 to firmly clamp the flanges 19 and 20 of the conductor bars between the dowel bar and the coupling clamp. This arrangement firmly aligns the conductor bars and provides a stiff coupling structure for transmitting both bending and torsional forces from one conductor bar to its adjoining bar.

To complete the coupling structure, a coupling cover or sheath 34 of insulating material is assembled or placed over the metal portions of the coupling structure to completely cover its exposed surfaces. The coupling cover has a main body portion 35 shaped to conform to the external surfaces of the coupling clamp, and has lips 36 projecting inwardly along its bottom edges such that they can be inserted underneath and around the bottom edges of the trolley-receiving groove A of the conductor bar. These lips contain an upwardly extending portion 37 which abuts the inner, vertical face of the trolley-receiving groove A to firmly lock the coupling cover in place. On each end of the main body portion 35 are end adapter portions 38 which conform in shape to the external surfaces of the rod-like structure and whose lower edges 39 terminate slightly above the lower edges of the side surfaces of the rod-like member. The insulating material 22 covering the rod-like member is peeled back slightly to permit the adapter sections of the coupling cover to be telescoped between the external surfaces of the rod-like member 10 and the insulating material. The above-referred to lips 36, which extend along the bottom edge of the main body portion of the coupling cover, project approximately one-eighth inch beyond the end of the main body portion into the adapter sections as at 40. Attached to the portion of the lower edges of the adapter sections, which are adjacent the lips 40, are ears 41 which extend under the bottom edges of the rod-like member but which do not have the inner, vertical projections 37. With the conductor bar insulation 22 terminating approximately one-fourth inch from each end of the coupling clamp, the conductor bar insulation 22 will overlie the adapter or end portions 38 of the coupling cover and will terminate adjacent the above-referred to lips 36 of the coupling cover such that the lips 24 of the conductor bar insulation will overlie the ears 41 of the cover and such that the lips 24 of the conductor bar insulation abut those of the coupling cover. It will be seen that the above-referred to ears 41 cover the lower, vertical surfaces of the rod-like member such that even though there is a slight gap between the above-referred to lips, the vertical metal surfaces of the rod-like member will not be exposed.

It will further be seen that by our invention, we have provided a new and improved shockproof trolley conductor and a coupling structure therefor, which structure is rigid and accurately aligns the ends of the conductor bars joined therewith, and that a novel and improved coupling cover has been provided to completely enclose the external surfaces of the conductor bar to prevent short circuits and/or contact by workmen. The coupling structure is comparatively light, can be made inexpensively, and can be used to attach conductor bar of any length by simply cutting the bar, removing end portions of the conductor bar insulation, and assembling the coupling structure.

While a preferred embodiment of the invention has been shown, it is our intention to cover hereby all adaptations, modifications, and changes therein which come within the practice of those skilled in the art to which the invention relates and the scope of the appended claim.

Having thus described our invention, we claim:

A shockproof trolley conductor for electrified mobile equipment, said trolley conductor comprising a plurality of lengths of conductor bar arranged in end to end abutting relation with one length forming a continuation of the other, each of said lengths comprising a rigid rod-like member substantially uniform in transverse cross section made of material of high electrical conductivity and having a longitudinally extending current collector receiving channel in one side extending from end to end of the member, at least one surface of which channel is adapted to be engaged by a current collector carried by the mobile equipment, said rod-like member also having a longitudinally extending dowel bar receiving aperture and a slotted opening communicating between the dowel bar receiving aperture and the external surface of the rod-like member opposite said current collector receiving channel, the width of said slotted opening being less than the width of said dowel bar receiving aperture, a dowel bar opposite end portions of which are inserted into the dowel bar receiving apertures in abutting end portions of said rod-like member, a generally U-shaped conductor bar clamp of uniform transverse cross section, the bottom internal surface of which is adapted to abut the surface of the rod-like member containing the slotted opening and the internal side surfaces of which are adapted to abut opposite external surfaces of the rod-like member intermediate the side containing the slotted opening and the current collector receiving channel to provide a rigid coupling structure between the conductor bars, means attaching said dowel bar and said clamp to the abutting end portions of adjacent lengths of rod-like member, each of said lengths of conductor bar also having a channel-like member substantially uniform in transverse cross section made of electrical insulating material and enclosing the external surfaces of said rod-like member excepting for the inner surfaces of said current collector receiving channel and the portions covered by said clamp, and a channel-like coupling cover made from insulating material and having a main body portion covering the conductor bar clamp and end portions inserted under the ends of the channel-like members, said coupling cover having generally spaced parallel side walls and each of said side walls terminating in a locking flange for engaging and locking over the outer edges of the side wall of the side walls of said current collector receiving channel.

References Cited in the file of this patent

UNITED STATES PATENTS

| | | |
|---|---|---|
| 278,627 | Taffe et al. | May 29, 1883 |
| 997,677 | Ivey | July 11, 1911 |
| 1,590,569 | Fisk | June 29, 1926 |
| 1,704,314 | Edwards et al. | Mar. 5, 1929 |
| 1,817,034 | Hotchkin | Aug. 4, 1931 |
| 1,962,554 | De Mask | June 12, 1934 |
| 2,013,207 | Hamm et al. | Sept. 3, 1935 |
| 2,014,729 | Frank et al. | Sept. 17, 1935 |
| 2,640,114 | Wehr | May 26, 1953 |
| 2,704,309 | Ford et al. | Mar. 15, 1955 |